(12) United States Patent
Sizer

(10) Patent No.: US 9,265,269 B2
(45) Date of Patent: *Feb. 23, 2016

(54) PROCESS FOR MAKING A SHELF-STABLE MILK BASED BEVERAGE CONCENTRATE

(71) Applicant: Dairyvative Technologies, LLC, Lincoln, MA (US)

(72) Inventor: Charles E. Sizer, Westford, MA (US)

(73) Assignee: DAIRYVATIVE TECHNOLOGIES, LLC, Lincoln, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/513,069

(22) Filed: Oct. 13, 2014

(65) Prior Publication Data

US 2015/0030724 A1 Jan. 29, 2015

Related U.S. Application Data

(63) Continuation of application No. 12/488,591, filed on Jun. 22, 2009.

(60) Provisional application No. 61/075,015, filed on Jun. 24, 2008.

(51) Int. Cl.

| | |
|---|---|
| A23C 1/00 | (2006.01) |
| A23C 1/14 | (2006.01) |
| A23C 9/12 | (2006.01) |
| A23C 1/16 | (2006.01) |
| A23C 9/13 | (2006.01) |
| A23C 1/12 | (2006.01) |
| A23C 9/127 | (2006.01) |
| A23C 19/00 | (2006.01) |

(52) U.S. Cl.
CPC ............. *A23C 9/1206* (2013.01); *A23C 1/12* (2013.01); *A23C 1/16* (2013.01); *A23C 9/1307* (2013.01)

(58) Field of Classification Search
USPC .......................................................... 426/42
See application file for complete search history.

(56) References Cited

U.S. PATENT DOCUMENTS

| | | | | |
|---|---|---|---|---|
| 2,319,362 | A | * | 5/1943 | Wouters ................ 426/546 |
| 2,668,765 | A | * | 2/1954 | Stimpson ............... 426/42 |
| 4,497,834 | A | * | 2/1985 | Barta .................... 426/42 |
| 5,064,660 | A | | 11/1991 | Silver |
| 6,039,985 | A | | 3/2000 | Kamarei |
| 6,635,302 | B1 | | 10/2003 | Huang et al. |
| 6,887,505 | B2 | | 5/2005 | Reaves et al. |
| 2005/0214409 | A1 | | 9/2005 | Tossavainen et al. |
| 2007/0166447 | A1 | | 7/2007 | Ur-Rehman et al. |
| 2007/0172548 | A1 | | 7/2007 | Cale et al. |
| 2008/0050492 | A1 | | 2/2008 | Buetler et al. |

FOREIGN PATENT DOCUMENTS

| | | |
|---|---|---|
| EP | 1707056 | 10/2006 |
| KR | 20000049535 | 8/2000 |
| KR | 20030010351 | 2/2003 |
| KR | 20040103818 | 12/2004 |
| WO | 03/094623 | 11/2003 |

OTHER PUBLICATIONS

Cunningham et al., System Identification of a Falling-Film Evaporator in the Dairy Industry, USTARTH, p. 1-7, 2006.*
Cunningham et al., System Identification of a Falling-Film Evaporator in the Dairy Industry, USARTH, p. 1-7, 2006.
Bylund, Chapter 16 of Dairy Processing Handbook, 1995, Tetra Pak Processing Systems AB, S-221 86 Lund, Sweden.
Henning, D.R. et al., Major advances in concentrated and dry milk products, cheese, and milk fat-based spreads, J. Dairy Sci., 89(4):1179-1188 (2006).
Penn State, Water Activity of Foods Table, accessed at http://extension.psu.edu/food-safety/food-preservation/contacts, and sourced from Water Activity of Some Foods and Susceptibility to Spoilage by Microorganisms Adapted from Beuchat (1981).
H. Eddleman, Composition of Human, Cow and Goats Milk, Indiana Biolab, 1999 accessed at http://www.goatworld.com/articles/goatmilk/colostrum.shtml.
Written Opinion of the International Searching Authority for International Application No. PCT/US2009/048329.
Search Report of the European Patent Office for European Patent Application No. EP 09 79 8504.

* cited by examiner

*Primary Examiner* — D. Lawrence Tarazano
*Assistant Examiner* — Philip Dubois
(74) *Attorney, Agent, or Firm* — Michael Best & Friedrich LLP

(57) ABSTRACT

A concentrate, system and low-temperature process for preparing a shelf-stable milk concentrate that does not require ultra-high temperature thermal processing for control of the microbiology of the product is disclosed herein. The method preferably incorporates aseptic technology and the enzymatic reduction of lactose to control water activity. The method preferably includes the enzymatic conversion of the lactose in the milk to its component sugars glucose and galactose, which preferably changes the colligative properties of the concentrate, decreases the amount of free water, and reduces the osmolarity.

6 Claims, 5 Drawing Sheets

PROCESS FOR MAKING A SHELF-STABLE MILK BASED BEVERAGE CONCENTRATE

CROSS-REFERENCE TO RELATED APPLICATIONS

This is a continuation of U.S. patent application Ser. No. 12/488,591, filed on Jun. 22, 2009, which claims priority to U.S. Patent Application No. 61/075,015, filed on Jun. 24, 2008, the entire contents of all of which are fully incorporated herein by reference.

STATEMENT REGARDING FEDERALLY SPONSORED RESEARCH OR DEVELOPMENT

Not Applicable

BACKGROUND OF THE INVENTION

1. Field of the Invention

The present invention relates to processes for making shelf stable milk beverages.

2. Description of the Related Art

For millennia man has tried unsuccessfully to devise a method for preserving milk which would retain the nutrients and qualities of flesh milk. Roman soldiers subsisted on rations made from dried milk using primitive sun drying techniques. Later technology developed by Gail Borden (1858) resulted in sweetened condensed milk which could be preserved for years using simple concentration methods utilizing water activity as the microbiological control point. More modern milk processing and packaging technologies combine Ultra-High Temperature Processing with aseptic packaging to preserve the shelf-life of milk. The foregoing technologies achieved the preservation aspects but failed to preserve the fresh quality needed for ready to drink products. Sweetened condensed milk is made by concentrating milk 2.5× with added sucrose to control the water activity ($\alpha<0.85$). Water activity is a measure of food dryness. $a_w=p/p_0$, where $a_w$ is water activity, p is the vapor pressure of water in the substance, and $p_0$ the vapor pressure of pure water at the same temperature. Water activity as a value has no dimensions. Pure water has a water activity of 1. The resulting product is tan in appearance, has a distinct fat off-taste, coarse texture from lactose crystallization and cannot be reconstituted to a single strength beverage. Similarly, evaporated milk is a 2.1× concentrate which is placed in a can and thermally treated to produce a commercially sterile product (in compliance with 21CFR113). The resulting milk is tan in appearance and unacceptable when diluted to single strength.

Fluid single-strength milk requires a thermal treatment to control microbial growth, inactivate enzymes and stabilize the milk. The Pasteurized Milk Ordinance requires specific time-temperature combinations for the inactivation of infectious pathogens such as *Coxiell burnetti, Mycobacterium tuberculosis* and *Salmonella* spp. in refrigerated milk products. Shelf-stable, UHT milk products require a thermal treatment which addresses not only the infectious pathogens but also the toxin producing, heat-resistant spore-formers like *Clostridium botulinum* or *Bacillus cereus*. Typical processes fir UHT milk require heating the milk to 286° F. for 6 seconds (or the equivalent process). UHT milk has a pronounced cooked taste and is not well accepted.

UHT/aseptic treatment of milk concentrates has been demonstrated commercially but is technically very difficult due to problems associated with the stability of the concentrated product. Lactose precipitation results in a graininess of the product and slows reconstitution. Hydrolysis of the milk sugar prior to UHT treatment results in increased Maillard reaction browning with noticeable changes in the color and flavor of the milk. Hydrolysis prior to UHT also results in decreased shelf-life for the product.

Hydrolysis of lactose prior to processing results in significant increases in Maillard browning reaction products and produces an unacceptable product. Dosing of lactase enzyme using sterile filtration significantly reduces the browning and extends the life of the product.

The prior art discloses ultra-high pasteurization of milk such as disclosed in Reaves et al., U.S. Pat. No. 6,887,505, for Ultra-High Temperature Pasteurized Milk Concentrate, Package, Dispenser And Method Of Producing Same.

There is a need for a milk concentrate that upon rehydration tastes fresh.

BRIEF SUMMARY OF THE INVENTION

The present invention is preferably a method for preserving milk using a concentration method that incorporates aseptic technology and the enzymatic reduction of lactose to control water activity. The method includes the enzymatic conversion of the lactose in the milk to its component sugars glucose and galactose. This reaction changes the colligative properties of the concentrate, decreases the amount of free water, and reduces the osmolarity.

Milk (0.2-3.25% fat) is concentrated using low-temperature, vacuum evaporation to produce a 3.0-4.2× concentrate. As the concentration of the milk increases, so does the viscosity. At this point, the addition of lactase enzyme at a rate of 0.01-5 ml per liter results in very rapid decrease in the lactose concentration resulting in significant changes in the colligative properties of the concentrate. The viscosity decreases and the milks ability to be further concentrated improves dramatically. Further concentration can be accomplished by further treatment in temperature controlled vacuum pans or by the addition of non-fat dry milk solids using high shear.

The hydrolysis of lactose requires the incorporation of equal moles of water and lactose to yield one mole each of glucose and galactose. Neutral lactase enzyme (2600-4000 units per liter (MaxiLact)) is injected into the milk concentrate to hydrolyze the lactose sugar into glucose and galactose. Preferably, a minimum of 70% of the lactose must be hydrolyzed and the desired level is in the 98% range. This process reduces water activity by decreasing the amount of water and by increasing the number of moles of sugar dissolved in the concentrate. Since lactose solubility is about 21.6%, a 4× concentration of milk is the practical limit of concentration using conventional technology. Further concentration results in graininess, crystallization and viscosity increases. Furthermore, the insoluble lactose must be subtracted from the water activity equation since it is no longer dissolved.

Anhydrous sugar(s) (75/25 w/w) are dissolved in the evaporated milk to begin reducing the water activity. The mixture is then heated to a temperature sufficient to inactivate vegetative pathogens (160-260° F.) and cooled using vacuum expansion in an aseptic falling film evaporator. The vacuum expansion minimizes the thermal effects of the process on the milk and simultaneously decreases the water concentration by about 1% for every 10 degrees F. of cooling. The product is further cooled to about 70-120° F. in a tubular heat exchanger and placed in an aseptic tank equipped with an agitator. Neutral lactase enzyme (2600-4000 units per liter (MaxiLact)) is injected into the milk to hydrolyze the lactose sugar into glucose and galactose. Preferably, a minimum of 70% of the lactose must be hydrolyzed and the desired level is in the 98% range.

The aseptic hydrolysis of lactose accomplishes many purposes. The majority of humans in the world are lactose intolerant. Hydrolysis of the lactose allows them to digest the milk without suffering from gas and bloating. In addition to the nutritional aspects, the hydrolysis reduces the water activity in the product by increasing the molarity of the solutes by forming two gram molecular weights of sugars from one. This essentially doubles the osmolarity contribution of the milk component of the formula which reduces the water activity for control of the microorganisms. The hydrolysis of the lactose into glucose and galactose uses one mole of $H_2O$ per mole weight of lactose further reducing the water activity.

The thermal process addresses the health and safety aspects of this product by inactivating vegetative pathogens which can survive down to a water activity of 0.85. Toxin forming sporeformers like C. botulinum are unable to grow at a water activity of less than 0.93. The most resistant sporeforming toxin form B. cereus bacteria are unable to grow at a water activity of less than 0.915. Thus, the combination of concentration, thermal treatment, enzymatic reduction of water activity and aseptic processing-packaging results in a product which is shelf-stable.

The typical application of this product would be for confectionary use, un-refrigerated distribution of commodity milk, production of whipped toppings, re-constitution of shakes, malts, smoothies or for re-constitution as a single strength beverage.

The concentrate is not governed by the FDA under 21CFR113 or 21CFR108 and is thus exempt from the low-acid canned foods (LACF) regulations. Similarly, condensed milk is not regulated by the Pasteurized Milk Ordinance and is considered by the USDA to be a Class II milk product.

A process for preparing a shelf-stable Pasteurized milk concentrate which can be reconstituted to a fresh-tasting product is disclosed herein. A low-temperature process for preparing a shelf-stable milk concentrate that does not require ultra-high temperature thermal processing for control of the microbiology of the product is disclosed herein. A method for preserving milk products which minimizes the thermal exposure of the protein fractions to temperatures where they are denatured which minimizes the thermal damage to the product is disclosed herein. A process for reducing the water activity of the product enzymatically rather than by thermal methods is disclosed herein. An enzymatic process which changes the colligative properties of concentrated milk making it possible to incorporate a higher concentration of solids is disclosed herein. A method for minimizing the thermal reactions of milk concentration by incorporating dry ingredients at the end of the process and by chemically increasing the osmolality of the product using lactase enzyme is disclosed herein. A method for removing lactose sugar from milk beverages is disclosed herein. A method for preserving a milk concentrate which can be reconstituted and dispensed is disclosed herein. A process for enzymatically removing sugars which promote product "graininess" is disclosed herein. A method for preparing a commercially sterile product which uses water activity to prevent the growth of spore-forming pathogens and which utilizes thermal processing to address vegetative spoilage organisms and pathogens is disclosed herein. A method of enzymatically preserving a food product to make it shelf-stable is disclosed herein. A method to control water activity enzymatically is disclosed herein. A method to minimize the browning of shelf-stable lactose reduced milk concentrates is disclosed herein. A method for making a lactose-reduced milk concentrate having active lactase enzyme is disclosed herein. A method for making a lactose-reduced milk concentrate having active lactase enzyme incorporating aseptic dosing of lactase enzyme into the evaporator effect which maintains the optimum enzyme activity is disclosed herein.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
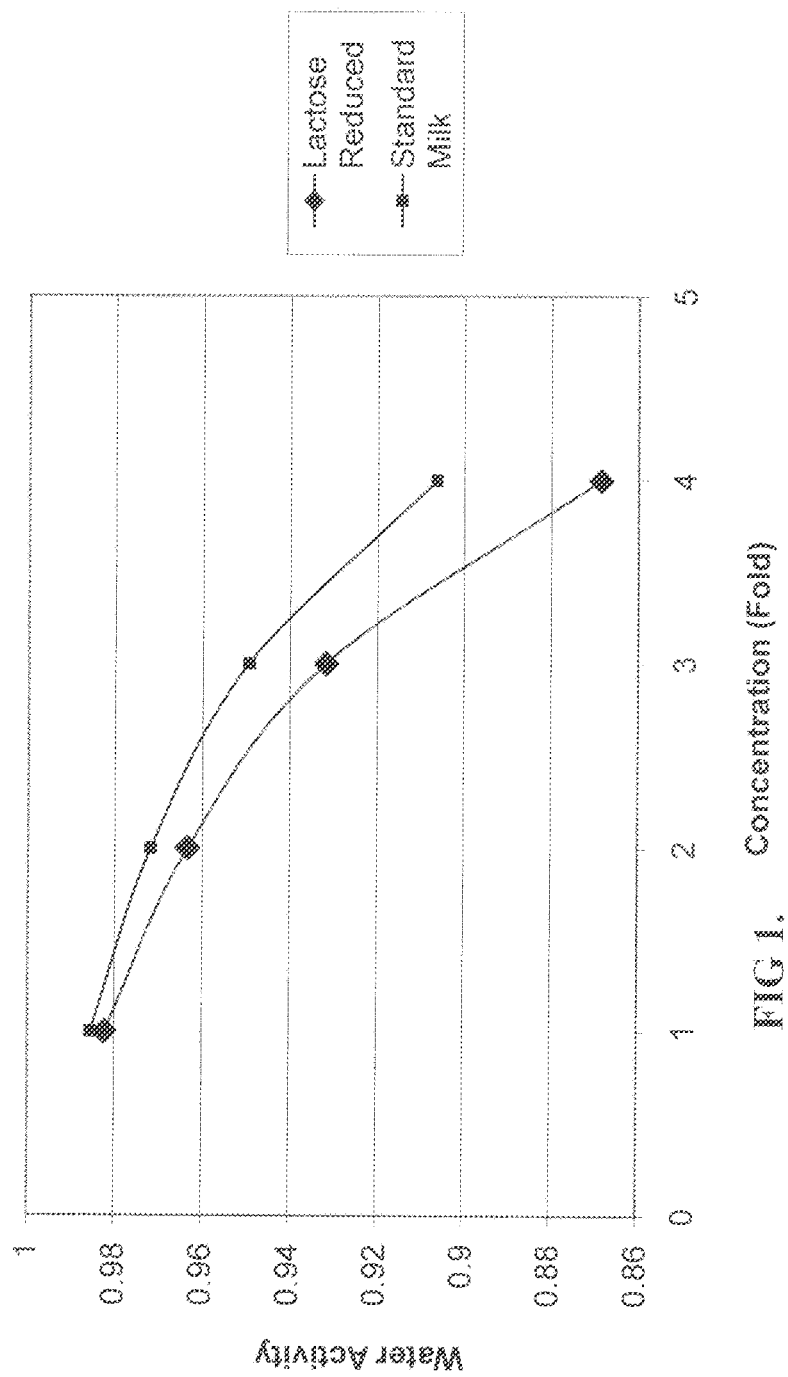
FIG. 1 is a graph of the water activity of concentrated skim milk and lactose reduced skim milk.

A process for preparing a shelf stable milk concentrate which can be reconstituted into a fresh tasting product is disclosed below.

The product is preferably made from conventional condensed milk formulated with traditional amounts of stabilizers required to maintain the suspension of milk proteins without precipitation. Anhydrous sugars (sucrose, glucose or fructose) are preferably incorporated (at 0-40% weight) into the pasteurized 4× milk concentrate with agitation and shearing. The temperature during this step is elevated to 4080° C. to aid in the solubilization of the sugars. The formed syrup is preferably free of crystals to prevent future crystallization. The warm, sweetened milk concentrate is preferably introduced at a pre-determined temperature into a pre-sterilized vacuum chamber (500 mbar) to decrease the temperature and evaporate additional water using technology developed for UHT processing. The vacuum chamber is preferably continuously evacuated using an aseptic pump to transfer the material over to a sterile tank. Further cooling using conventional aseptic tubular heat exchangers may be required to reduce the temperature of the sweetened condensed milk to the optimal temperature for lactose hydrolysis. The degree of concentration is preferably regulated by the initial temperature of the milk product as the milk product is introduced into the vacuum chamber and the degree of vacuum in the chamber.

A sterile tank is preferably used for a mixing tank to incorporate lactase enzyme into the milk. A solution of lactase enzyme is sterile filtered using aseptic technology and transferred into the sterile tank. The aseptic tank preferably has aseptic agitation to thoroughly mix any components added to the tank. The enzyme is a neutral lactase enzyme (2,600 to 4,000 lactase enzyme units) at a concentration of between 0.1 and 0.0001%. The enzyme acts in the following manner:

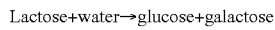

The reaction preferably takes one mole of the disaccharide lactose and creates two moles of the simple sugars glucose and galactose. The reaction reduces the osmolarity of the condensed milk by doubling the moles of sugar and by using one mole of water for hydrolysis of the α-linkage between the sugar moieties. The resulting product has received a thermal treatment adequate to address infectious, vegetative pathogens and has a water activity sufficiently low to prevent the growth of C. botulinum (α<0.93) and B. cereus (α<0.915). The water activity of the product is preferably 0.85 or below to address spoilage microbes of concern. The product is preferably commercially sterile.

Formulations for some preferred products are provided in Tables One, Two and Three. Table One is for an unflavored milk product. Table Two is for a vanilla flavored milk product and Table Three is for a chocolate flavored milk product.

TABLE ONE

| Ingredient | Weight % |
|---|---|
| 4X concentrated milk(3.25% fat ss, with additives) | 70.00% |
| Anhydrous Sugar (sucrose, glucose or fructose) | 29.99% |
| Lactase enzyme | .01% |

Vanilla Milk

TABLE TWO

| Ingredient | Weight % |
|---|---|
| 3.75X concentrated milk (2.0% fat ss, with additives) | 79.754% |
| Anhydrous Cane Sugar | 20.00% |
| Vanilla flavor (FONA KS06217wsi) | .20% |
| Salt | .036% |
| Lactase enzyme | .01% |

Chocolate Milk

TABLE THREE

| Ingredient | Weight % |
|---|---|
| 4X Milk (3.25% fat single strength) | 69.00% |
| Sugar | 26.00% |
| Cocoa powder | 4.00% |
| Vanilla flavor (anhydrous, ethanol) | .99% |
| Lactose enzyme | .01% |

Mixing

The dry ingredients are preferably completely dissolved in a warmed milk concentrate along with other ingredients including flavors and stabilizers.

Processing

The milk is preferably processed using a system designed for UHT processing system that preheats the milk product to 175° F. using indirect heating and is capable of injecting live steam into the product to bring it to a sterilizing temperature in the range of 175° F.-310° F. The system is preferably connected to an aseptic tank equipped with agitation and a sterile filtration system. The sterile product is preferably fed to an aseptic filler downstream of the sterile tank.

The equipment is preferably first brought to a condition of sterility by means of raising the temperature of the equipment to a least 250° F. for 30 minutes or the equivalent process. The system preferably operates in a water production mode with the hold tube at 280° F. until the milk product is introduced into the balance tank. As the milk product enters the system, the hold tube temperature is preferably reduced so as to maintain the integrity of the system and provide a minimal process for the prevention of pathogens in the milk product. The temperature is preferably brought down to the range of 170-240° F. in the holding tube. At the end of the holding tube, the milk concentrate preferably exits through a pressure reduction valve entering a pre-sterilized vacuum chamber. The concentrate preferably forms a falling film which provides a maximum area for removal of water from the product. The amount of water removed is dependent on the initial temperature on introduction into the chamber and the vacuum level maintained in the chamber. Typically, a vacuum of from 7-30 inches of mercury is maintained in the vacuum vessel. The milk product is preferably reduced in moisture by 1% for every 10° F. of temperature decrease.

The final heating of the milk is preferably accomplished with indirect heating such as plate heat exchangers or tubular heat exchangers. Direct coupling of electrical energy with Ohmic heating, direct heating or microwave accomplishes a rapid temperature increase without the introduction of water.

The condensed milk is preferably removed from the vacuum chamber using a positive pump such as a progressive cavity pump made by Moyno. The milk is then preferably conveyed to an aseptic homogenizer where it is homogenized at 2000/500 psi in two stage aseptic homogenization. The condensed milk is preferably conveyed to the final cooler where it is cooled to a temperature of less than 100° F. The milk is preferably conveyed to the aseptic tank valve cluster for diversion into the aseptic tank.

An aseptic dosing unit, preferably having a filter pore size of 0.2 microns, doses 0.1-0.0001% lactase enzyme into the milk concentrate. The amount of enzyme incorporated is preferably sufficient to quickly reduce the lactose concentration by at least 70% and most preferably by at least 97%. Other ingredients such as salt (sodium chloride) can be simultaneously injected into the product to reduce the water activity and minimize processing equipment corrosion.

The lactose reduced milk is next packaged in a sterile bag-in-box container to minimize water incorporation into the product and to minimize the introduction of spoilage microorganisms. The product preferably has a shelf-life of from 2 months to 12 months depending of the storage conditions.

FIG. 1 is graph of the water activity of concentrated skim milk and lactose reduced skim milk showing data that the hydrolysis of lactose can be used to reduce water activity. The addition of lactase enzyme has a resultant decrease in water activity. The results clearly demonstrate that water activity can be lowered by enzymatic conversion of lactose to glucose and galactose. The drop in water activity to 0.86 useful for preservation since bacterial spores can grow down to a water activity of 0.915. FIG. 3 is graph of calculated water activity for concentrated lactose reduced milk with different levels of anhydrous fructose. The graph shows that a milk concentrate with sucrose added decreases the water activity (grams/100 ml). By changing the sucrose to anhydrous fructose and increasing the lactase enzyme, it is possible to get down to 0.71 preferably using a vacuum process. In an alternative embodiment, additional lactase enzyme is added to get 100% hydrolysis of the milk lactose. The formula is preferably underdosed by adding on a volume basis rather than the moles of lactose basis. As can be seen from the graph, lactose reduction decreases water activity to 0.87. A vacuum removal of additional water is preferably used to decrease water activity to below 0.85. 4-6% removal corresponds to a 40-60 degree temperature loss in the vacuum chamber. Lactase enzyme is aseptically introduced into the product after cooling. Enzyme hydrolysis provides a lowered water activity for a milk concentrate.

Vanilla Milk Formula and Treatment.

A vanilla milk product is made from conventional condensed milk (3.6-4.2× Grassland, Class II Condensed). Lactase enzyme at 0.1-1 ml per liter is immediately added to the concentrate and allowed to react until the lactose is 70-99.5% hydrolyzed. After hydrolysis, milk powder (NFDM, Meijers) is added at a level to bring the milk to the desired level of concentration. The milk can be 4×-8× concentration as desired. The product is formulated with much lower levels of the traditional amounts of stabilizers required to maintain the suspension of milk proteins without precipitation. Anhydrous sugars (sucrose, glucose or fructose) are incorporated (at 0-50% weight (baker's percent)) into the pasteurized 4-8× milk concentrate with agitation and shearing. The temperature during this step will need to be elevated to 40-80° C. to aid in the solubilization of the sugars and yet not reduce the lactase enzyme activity. After incorporation of the sugars, the mixture is held until the desired water activity is reached (0.9-0.80). Additional ingredients such as stabilizers (gums, CMC or emulsifiers), salt and flavor may be added at this time. The water activity of each ingredient must be less than 0.85 to minimize adding more water. The formula for a five times concentrate vanilla milk product is set forth in Table Four and a formula for a six times concentrate vanilla milk product is set forth in Table Five.

TABLE FOUR

| Ingredient | Value |
| --- | --- |
| Grassland Concentrate | 1000 |
| Fructose (anhydrous) | 350 |
| NFDM | 112 |
| Flavor | 25 |
| Salt | 2.5 |

TABLE FIVE

| Ingredient | Value |
| --- | --- |
| Grassland Concentrate | 1000 |
| Fructose (anhydrous) | 420 |
| NFDM | 208 |
| Flavor | 30 |
| Salt | 3 |

The mixture is then preferably thermally treated with a process sufficient to inactivate the vegetative pathogenic organisms. Spoilage organisms capable of growing in the product under reduced must also be addressed by the final thermal process. The thermal treatment of the lactose reduced milk concentrate is preferably accomplished either by using aseptic processing and packaging or by using hot-filling. The aseptic process uses a presterilized aseptic processing system brought to the condition of commercial sterility by the application of heat. As soon as the system is sterilized, the milk product is preferably cooled maintaining the hold tube temperature and positive pressure. The milk product is preferably introduced and is used to push the water out of the system. The interface of water and product results in a mixture which has a water activity greater than the required limit. This interfacial product must be completely pushed through the system to prevent microbiological growth. As soon as the dissolved solids or water activity limits are reached, the milk product is packaged aseptically.

Alternatively, the milk product is heated to Pasteurization temperature (72-125° C.) and then hot-filled into a can, bottle or plastic container. The container is immediately closed and then cooled to ambient.

The processing step is preferably used as a final step to reduce the water content. After delivering the thermal treatment required for commercial sterility, the hot, lactose reduced milk concentrate is introduced at a pre-determined temperature into a pre-sterilized vacuum chamber (1-30 inches mercury vacuum) to decrease the temperature and evaporate additional water using aseptic originally technology developed for UHT processing. The vacuum chamber is preferably continuously evacuated using an aseptic pump to transfer the material over to a sterile tank. Further cooling using conventional aseptic tubular heat exchangers may be required to reduce the temperature of the sweetened condensed milk to the optimal temperature for lactose hydrolysis. The degree of concentration is preferably regulated by the initial temperature of the milk as it is introduced into the vacuum chamber and the degree of vacuum in the chamber. If additional enzyme is required, the additional enzyme is introduced at this point prior to the aseptic tank.

The sterile, aseptic tank is preferably used thr a mixing tank to incorporate lactase enzyme into the milk. A solution of lactase enzyme is sterile filtered using aseptic technology and transferred into the sterile tank. The aseptic tank preferably has aseptic agitation to thoroughly mix any components added to the tank. The enzyme is a neutral lactase enzyme (2,600 to 4,000 lactase enzyme units at a concentration of between 0.1 and 0.0001%. The enzyme acts in the following manner:

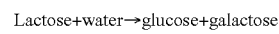

Lactose+water→glucose+galactose

The reaction preferably takes one mole of the disaccharide lactose and creates two moles of the simple sugars glucose and galactose. The reaction preferably reduces the osmolarity of the condensed milk by doubting the moles of sugar and by using one mole of water for hydrolysis of the α-linkage between the sugar moieties. The resulting product preferably has received a thermal treatment adequate to address infectious, vegetative pathogens and has a water activity sufficiently low to prevent the growth of C. botulinum (α<0.93) and B. cereus (α<0.915). The water activity of the product is preferably 0.85 or below to address spoilage microbes of concern. The product is preferably commercially sterile.

Figure 3:
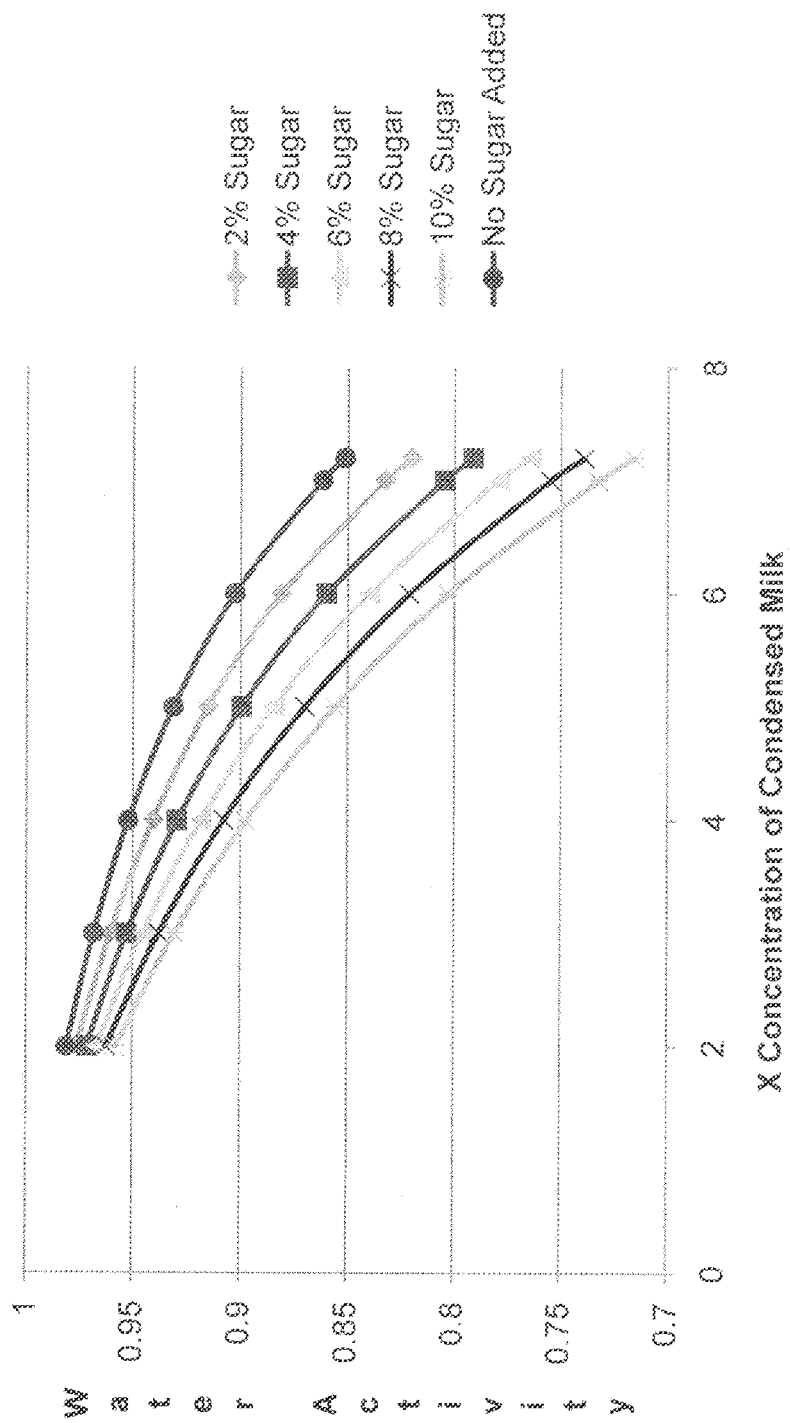
FIG. 3 is a graph of calculated water activity for concentrated lactose reduced milk with different levels of anhydrous fructose.

The addition of sugars for sweetening also reduces the water activity. Monosaccharide sugars like fructose, glucose and galactose have twice the water activity reducing power as disaccharides like glucose or galactose. Typically, flavored milks have between 5-8% sugar (single strength) added to increase the sweetness. Fructose or glucose is/are preferably used alone or in combination to sweeten and reduce water activity. FIG. 3 shows the calculated water activity of lactose reduced milk (95% reduced) concentrates with varying levels of monosaccharide.

TABLE SIX

| Ingredient | Value |
| --- | --- |
| Grassland Concentrate | 1000 |
| Fructose (anhydrous) | 420 |
| NFDM | 208 |
| Bakers Chocolate | 120 |
| Salt | 3 |

A formula for chocolate milk is set forth in Table Six. The chocolate milk is made in the same fashion as the vanilla milk with the exception of the addition of the baker's chocolate. The chocolate is melted and incorporated into the lactose reduced milk concentrate with high shear. The lactose reduced milk concentrate is preferably then homogenized to fully incorporate the chocolate into a stable emulsion capable of extended storage. Emulsifiers and stabilizers may be added to enhance stability. The chocolate milk is preferably then thermally treated and packaged aseptically or hot-filled. Chocolate withstands the hot-fill process since color changes are not apparent after hot-filling.

Processing System for Processing Milk with Incorporated Dry Milk Solids.

Figure 2:
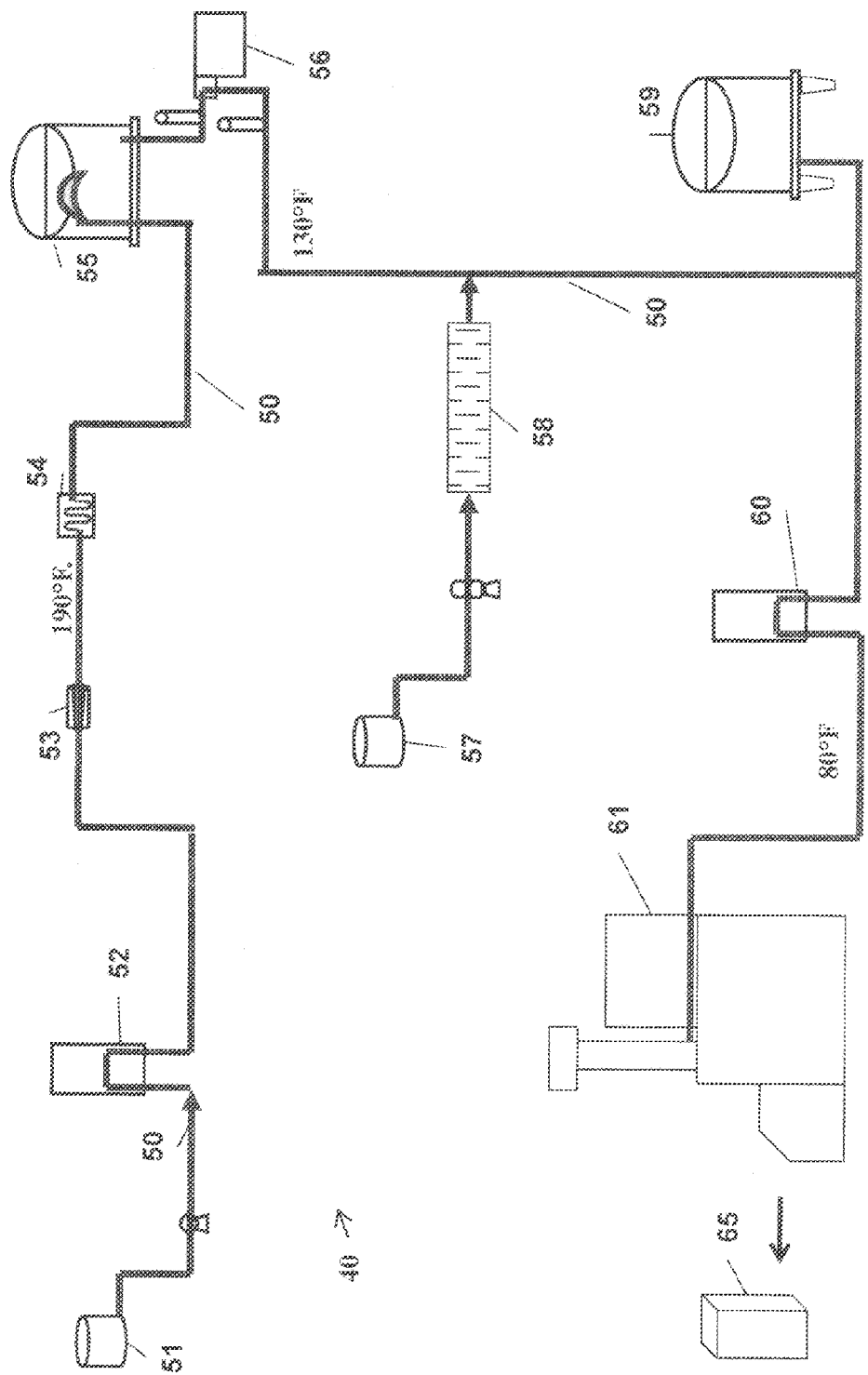
FIG. 2 is a block diagram of a system for a thermal process incorporating a microbiological kill step, concentration step, aseptic homogenization, aseptic dosing, an aseptic reaction vessel, a cooler and aseptic packaging.

A processing system 40 for processing a milk product is shown in FIG. 2. The equipment is preferably first brought to a condition of sterility by means of raising the temperature of the equipment to a least 250° F. for 30 minutes or the equivalent process. The system 40 operates in water production with the hold tube at 280° F. until a milk product is introduced into a balance tank 51. As the milk product enters the system 40, a temperature of a hold tube 54 is reduced so as to maintain the integrity of the system 40 and provide a minimal process for the prevention of pathogens in the milk product. The components of the system 40 are in flow communication through aseptic tubing 50. The temperature can be brought down to the range of 170-240° F. in the holding tube 54. At the end of the hold tube 54, the milk product exits through a pressure reduction valve entering a pre-sterilized vacuum vessel 55. The milk product preferably forms a falling film which provides maximum area for removal of water from the milk product. The amount of water removed is dependent on the initial temperature on introduction into the chamber and the vacuum level maintained in the chamber. Typically, a vacuum of from 7-30" of mercury is maintained in the vacuum vessel 55. The milk product is preferably reduced in moisture by 1% for every 10° F. of temperature decrease.

The final heating of the milk is accomplished with indirect heating such as plate heat exchangers or tubular heat exchangers. Although steam injection (provided by an optional steam injector 53) is commonly used for milk products, preferably in this system 40 a steam injector is not utilized to avoid the introduction of additional water which must be subsequently removed. Alternatively, direct coupling of electrical energy with Ohmic heating, direct heating or microwave accomplishes a rapid temperature increase without the introduction of additional water into the milk product.

A condensed milk is removed from the vacuum vessel 55, preferably using a centrifugal or positive pump such as a progressive cavity pump made by Moyno. The condensed milk is conveyed to an aseptic homogenizer 56 where the condensed milk is homogenized, preferably at 2000/500 psi in a two stage aseptic homogenization. The homogenized condensed milk is preferably conveyed to a cooler where the homogenized condensed milk is preferably cooled to a temperature of less than 100° F. The cooled, homogenized condensed milk is preferably conveyed to an aseptic tank valve cluster for diversion into an aseptic reactor tank 59.

An aseptic dosing unit 58, preferably having a filter pore size of 0.2 microns, doses 0.1-0.0001% lactase enzyme from a balance tank 57 into the aseptic reactor tank 59 having the cooled, homogenized condensed milk to create a lactose reduced milk product. The amount of enzyme incorporated is preferably sufficient to quickly reduce the lactose concentration by at least 70% and most preferably by at least 97%. Other ingredients such as salt (sodium chloride) are simultaneously injected into the aseptic reactor tank 59 to preferably reduce the water activity and minimize processing equipment corrosion.

The lactose reduced milk product is preferably next cooled at a cooler 60, and packaged, using an aseptic filling machine 61, in a sterile bag-in-box container 65 to minimize water incorporation into the product and to minimize the introduction of spoilage microorganisms. The product preferably has a shelf-life of from 2 months to 12 months depending on the storage conditions. Since the microbiology is water activity controlled, there is no need of micro testing to assure the commercial sterility of the product and thus the final product can be immediately released for distribution.

Processing System for Making a High-Solids, Liquid, Lactose Reduced, Milk Concentrate.

Multi-effect effect evaporators are preferably used to remove water from milk to make milk concentrates. A typical evaporator uses 6-effects for sequential water removal. One such multi-effect evaporator is an ANHYDRO Evaporation System available from Anhydro A/S of Copenhagen, Denmark (see www.anhydro.com). Each successive step operates at a lower pressure and subsequently at a lower temperature as well.

Figure 4:
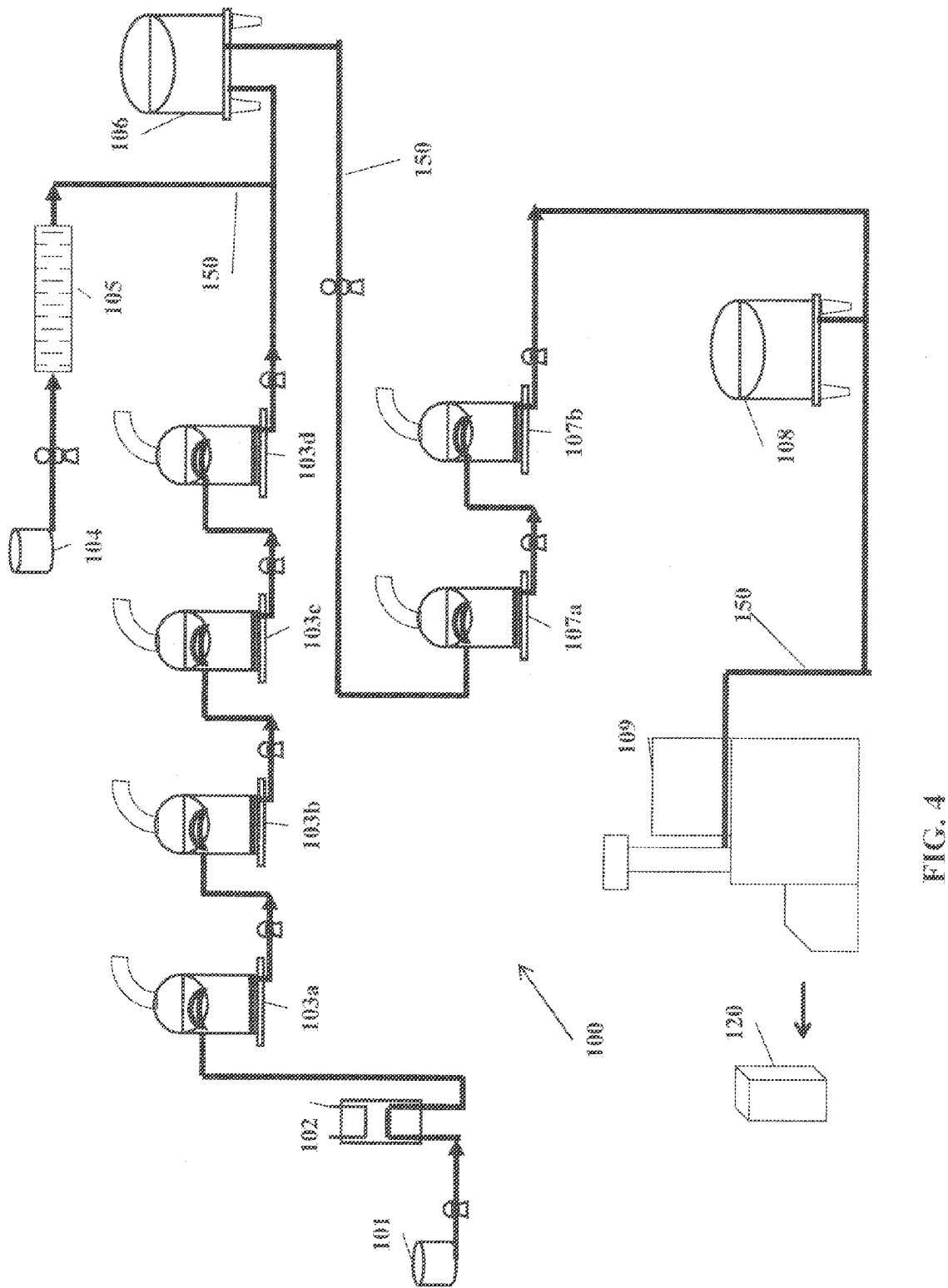
FIG. 4 is a block diagram of a system for an aseptic multi-effect evaporator with aseptic filtered lactase enzyme injection, a reactor vessel and aseptic packaging.

FIG. 4 is a block diagram of a system 100 for an aseptic multi-effect evaporator with aseptic filtered lactase enzyme injection, a reactor vessel and aseptic packaging.

Figure 5:
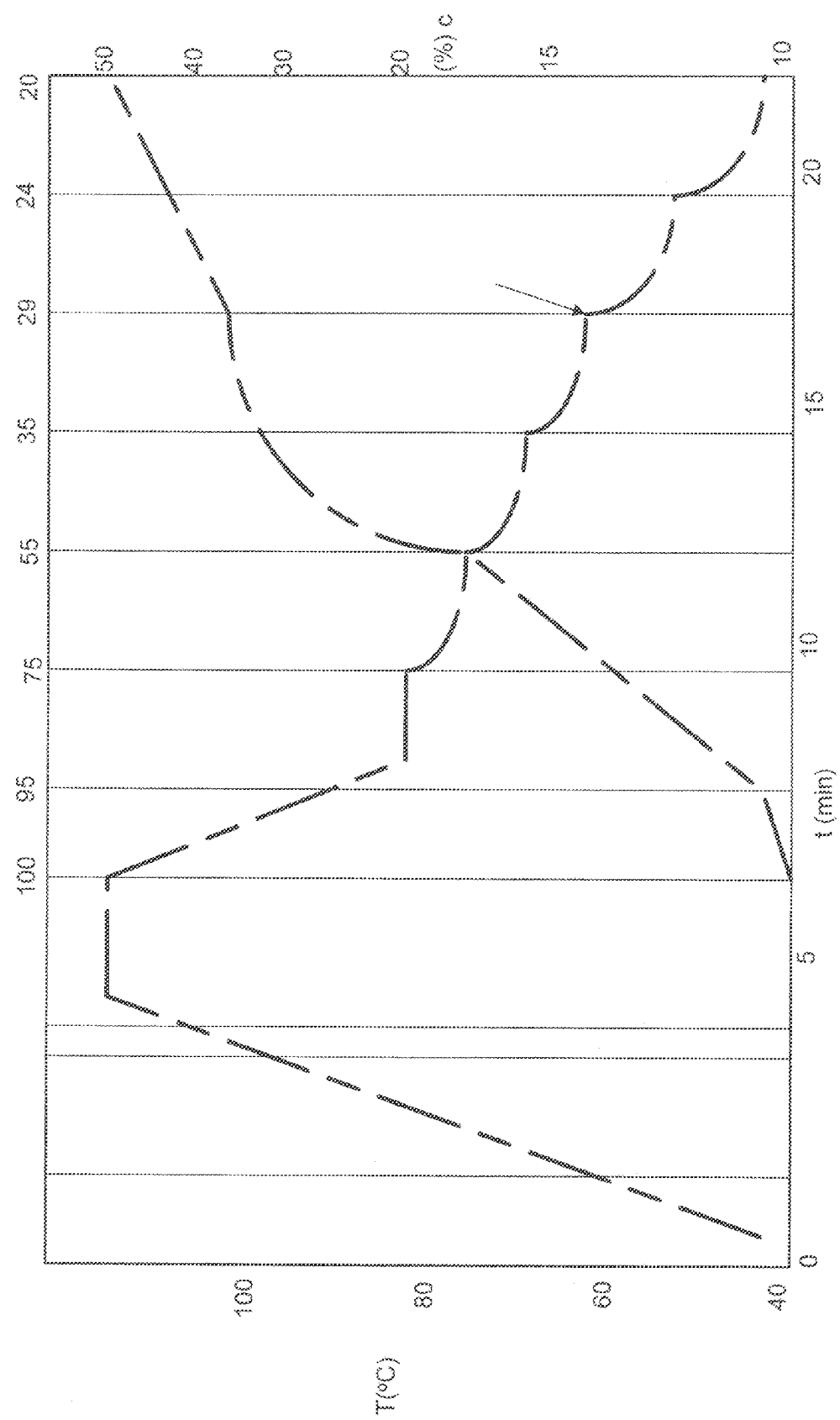
FIG. 5 is a graph of temperature (T) and dry matter content (c) of skim milk as a function of time (t) for a multiple effect evaporator illustrating the point of introduction of lactase enzyme after effect 4 at a temperature of 46 degrees Centigrade.

At the first effect 103a, raw milk in a single strength balance tank 101 is heated with an indirect heater 102 to 100° C. for 0.0001-5 minutes to inactivate target microorganisms and inactivate enzymes. After the hold time, it is injected into the first effect where water is flashed off rapidly reducing the temperature as the moisture is removed. The typical temperature profile for the milk undergoing the evaporation process is illustrated FIG. 5. As the milk resides in the pan of the first effect, additional heat is added to provide the energy to evaporate the water. The temperature of the first effect is about 70° C. The solids content increases from 10% to 13% in the first effect.

At the second effect 103b, the milk is pumped from the first effect into the second effect which is maintained at a slightly lower pressure. The pressure in the second effect also dictates the temperature which is usually about 5° C. lower than the first effect. The milk solids increase from 13 to 18% as water is removed.

At the third effect 103c, the milk is pumped from the second effect into the third effect which is maintained at a slightly lower temperature about 3° C. lower than the previous effect. The solids content increases from 18% to 27%.

At the third effect 103d, the milk is pumped from third effect into the fourth effect which is maintained at a slightly lower pressure about 2° C. than effect three. Effect 4 is at 60° C. This temperature is a legal pasteurization temperature but also can reduce the activity of lactase enzyme. The solids content increase from 28% to 34% in this effect.

At the fifth effect 107a, the milk from effect 4 is pumped into the vacuum vessel of effect 5 at a temperature of 60° C. At this point, while the milk is at 60° C., the lactase enzyme is introduced into the milk. As the enzyme is added, it is simultaneously flashed into fifth effect 107a reducing the temperature to 48° C. Lactase enzyme has its highest activity at 47° C. and thus this is the optimum location for introduction of the enzyme. The security of the dosing valve is maintained by the temperature and the activity of the enzyme is optimal. As the enzyme resides in the pan of fifth effect 107a, the enzyme rapidly hydrolyzes the lactose and changes the colligative properties making it easier to handle by reducing viscosity. The solids content of the concentrate increase from 34% to 42% as water is evaporated. Additional water is used from the hydrolysis reaction further increasing the solids content.

At the sixth effect 107b, the milk from fifth effect 107a is pumped into the final vacuum vessel of the sixth effect 107b which is at a temperature of 43° C. Additional water is removed in this section increasing the solids concentration from 42% to 50%. Enzyme added in the fifth effect 107a remains active in this effect and all subsequent process. The milk from sixth effect 107b is a 1+4 concentrate or a 5× milk. Further concentration can be achieved on the same equipment by increasing the residence time and increasing temperatures to accomplish a higher reduction. The product is then pumped to aseptic tank 108 and stored at 80° F. Then the product is preferably pumped to aseptic filling machine 109 for packaging into an aspectic container 120.

Table Seven set forth the contents of an example pre and post hydrolysis to a 7.2 times concentration.

TABLE SEVEN

| Proximates | Pre-hydrolyzation | Post-hydrolyzation and 7.2 X conc. |
|---|---|---|
| Water (g) | 90.84 | 34.08 |
| Energy (kcal) | 34 | |
| Energy (kj) | 143 | |
| Protein (g) | 3.37 | 3.37 |
| Total lipid(fat) (g) | 0.08 | 0.08 |
| Ash (g) | 0.75 | 0.75 |
| Glucose (g) | 0 | 2.4175 |
| Fructose (g) | 0 | |
| Lactose (g) | 5.09 | 0.2545 |
| Galactose (g) | 0 | 2.4175 |
| Water activity | 0.99 | 0.85 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for preparing a shelf-stable milk concentrate, the method comprising:
   (a) introducing a raw milk product into a balance tank;
   (b) heating the raw milk product in a preheater to create a preheated milk product;
   (c) injecting the preheated milk product into a first effect of an evaporator, wherein the preheated milk product is heated at a temperature of about 70° C. to evaporate water and increase a solids content of the preheated milk product to create a first effect milk product with a solids concentration of from 10% to 13%;
   (d) injecting the first effect milk product into a second effect of the evaporator, wherein the first effect milk product is heated at a temperature of about 65° C. to evaporate water and increase a solids content of the first effect milk product to create a second effect milk product with a solids concentration of from 13% to 18%;
   (e) injecting the second effect milk product into a third effect of the evaporator, wherein the second effect milk product is heated at a temperature of about 62° C. to evaporate water and increase a solids content of the second effect milk product to create a third effect milk product with a solids concentration of from 18% to 27%;
   (f) injecting the third effect milk product into a fourth effect of the evaporator, wherein the third effect milk product is heated at a temperature of about 60° C. to evaporate water and increase a solids content of the third effect milk product to create the milk concentrate with a solids concentration of from 28% to 34%;
   (g) injecting the milk concentrate into a fifth effect of the evaporator along with aseptically adding a lactase enzyme, wherein the fifth effect is heated at a temperature of about 48° C. to evaporate water and increase a solids content to create a hydrolyzed milk concentrate with a solid concentration of from 34% to 42%;
   (h) injecting the hydrolyzed milk concentrate into a sixth effect of the evaporator, wherein the hydrolyzed milk concentrate is heated at a temperature of about 43° C. to evaporate water and increase a solids content of the hydrolyzed milk concentrate to create a final hydrolyzed milk concentrate with a solids concentration of from 42% to 50%;
   (i) immediately following step (h), holding the final hydrolyzed milk concentrate in an aseptic tank at a temperature of about 80° F.; and
   (j) immediately following step (i), packaging the final hydrolyzed milk concentrate in an aseptic container using an aseptic filling machine.

2. The method of claim 1, wherein the hydrolyzed milk concentrate comprises glucose and galactose.

3. The method of claim 1, wherein the hydrolyzed milk concentrate is from 70% to 99.5% hydrolyzed.

4. The method of claim 1, wherein addition of lactase enzyme includes an aseptic dosing unit.

5. The method of claim 4, wherein the aseptic dosing unit includes a filter pore size of 0.2 microns.

6. The method of claim 1, wherein addition of lactase enzyme includes sterile filtering.

\* \* \* \* \*